United States Patent
Xu et al.

(10) Patent No.: US 11,871,165 B2
(45) Date of Patent: Jan. 9, 2024

(54) ENHANCED LINE MONITORING AND PARAMETER REPORTING FOR HIGH FIBER COUNT UNDERSEA FIBER OPTIC TRANSMISSION SYSTEMS WITH MULTIPLE SWITCHABLE BRANCHES

(71) Applicant: SUBCOM, LLC, Eatontown, NJ (US)

(72) Inventors: Yunlu Xu, Howell, NJ (US); Richard Kram, Middletown, DE (US); Yuriy Tsaltskan, Morganville, NJ (US); Lara Denise Garrett, Red Bank, NJ (US); Stacy Test, Toms River, NJ (US)

(73) Assignee: SUBCOM, LLC, Eatontown, NJ (US)

( * ) Notice: Subject to any disclaimer, the term of this patent is extended or adjusted under 35 U.S.C. 154(b) by 0 days.

(21) Appl. No.: 17/581,111

(22) Filed: Jan. 21, 2022

(65) Prior Publication Data

US 2023/0239598 A1    Jul. 27, 2023

(51) Int. Cl.
*H04B 10/07* (2013.01)
*H04Q 11/00* (2006.01)
(Continued)

(52) U.S. Cl.
CPC ....... *H04Q 11/0062* (2013.01); *H04B 10/038* (2013.01); *H04B 10/0795* (2013.01);
(Continued)

(58) Field of Classification Search
CPC .......................................... H04B 10/07–0799
See application file for complete search history.

(56) References Cited

U.S. PATENT DOCUMENTS

| | | | |
|---|---|---|---|
| 6,134,032 A | 10/2000 | Kram et al. | |
| 10,404,362 B1 | 9/2019 | Xu et al. | |

(Continued)

FOREIGN PATENT DOCUMENTS

| | | | | |
|---|---|---|---|---|
| EP | 1758279 A1 | 2/2007 | | |
| EP | 3518439 | * 1/2019 | ........... | H04B 10/035 |
| EP | 3518439 A1 | 7/2019 | | |

OTHER PUBLICATIONS

Sambo Nicola et al., "Field Trial: Demonstrating Automatic Reconfiguration of Optical Networks Based on Finite State Machine," Journal of Lightwave Technology, IEEE, USA, vol. 37, No. 16, Aug. 15, 2019, pp. 4090-4097.

(Continued)

*Primary Examiner* — Nathan M Cors
(74) *Attorney, Agent, or Firm* — KDW Firm PLLC

(57) ABSTRACT

Provided are techniques, devices and systems that enable updating of a reportable parameter table database when a reconfigured optical communication path is formed by switching performed by a branching unit in an undersea optical communication transmission system. A processor may obtain system attributes of each respective segment of a number of segments of the reconfigured optical communication path from a first end point to a second endpoint. The system attributes of each respective segment of the number of segments may be evaluated from the first end point to the second endpoint of the reconfigured optical communication path. A reportable parameter table may be generated based on the evaluated system attributes that includes a listing of operational and structural parameters of system from the first endpoint to the second endpoint of the reconfigured optical communication path.

8 Claims, 9 Drawing Sheets

(51) Int. Cl.
*H04B 10/038* (2013.01)
*H04B 10/079* (2013.01)
*H04L 41/069* (2022.01)
*H04L 41/12* (2022.01)

(52) U.S. Cl.
CPC ............ *H04L 41/069* (2013.01); *H04L 41/12* (2013.01); *H04Q 2011/009* (2013.01); *H04Q 2011/0073* (2013.01); *H04Q 2011/0081* (2013.01)

(56) References Cited

U.S. PATENT DOCUMENTS

| | | |
|---|---|---|
| 10,637,565 B2 | 4/2020 | Richardson et al. |
| 2004/0105136 A1 | 6/2004 | Feinberg |
| 2012/0230671 A1* | 9/2012 | Nakada ................. H04L 1/1825 398/1 |
| 2017/0149650 A1* | 5/2017 | Tsaltskan ........... H04Q 11/0066 |
| 2018/0343078 A1* | 11/2018 | Roberts .................. H04B 10/58 |
| 2019/0103939 A1* | 4/2019 | Al Sayeed .......... H04J 14/0287 |
| 2019/0222307 A1 | 7/2019 | Richardson |
| 2019/0260468 A1* | 8/2019 | Xu ..................... H04B 10/0771 |

OTHER PUBLICATIONS

Partial European Search Report for U.S. Appl. No. 23/150,604 dated Jun. 14, 2023.
European Search Report and Written Opinion for the European Application No. EP23150604, dated Sep. 18, 2023, 20 pages.

\* cited by examiner

ENHANCED LINE MONITORING AND PARAMETER REPORTING FOR HIGH FIBER COUNT UNDERSEA FIBER OPTIC TRANSMISSION SYSTEMS WITH MULTIPLE SWITCHABLE BRANCHES

TECHNICAL FIELD

This disclosure relates generally to the field of undersea optical fiber communication networks and relates more particularly to configuration management for a line monitoring system of the optical fiber communication network.

BACKGROUND

Fiber optic telecommunication systems carry much of the world's data between different geographical locations. Such systems are generally made up of cables that include one or more pairs of optical fibers—for example, many of today's telecommunication system cables include any number of pairs of optical fibers. Each fiber may carry data on multiple channels, which may represent physical or logical divisions of the fiber. A typical fiber might be divided, for instance, into up to one hundred and twenty (220) channels.

The bidirectional optical fiber transmission paths in undersea cables use routine line monitoring to detect changes in performance and to minimize the potential loss of service by detecting and resolving performance issues at an early stage. One monitoring technique is to transmit a test signal from a system endpoint into one fiber direction on the bidirectional path, and then detect a small return signal from optical amplifiers along the optical path in the return fiber direction using the data returned from high loss loopback based line monitoring signals.

When there is a change in performance along the optical path, the amplitudes of these loopback signals change in the amplifiers surrounding the fault location. There are patterns in these changes, referred to here as "fault signatures", and different patterns indicate the magnitude and type of the fault condition. These fault conditions include, but are not limited to, changes in fiber span loss, changes in optical amplifier pump laser output power and fiber breaks. An enhanced automatic signature analysis (eASA) algorithm can be adopted to recognize these signatures and report results. With the eASA results, a reportable parameter table can be calculated using the enhanced line monitoring systems (eLMS) system, such as that discussed in U.S. Pat. No. 10,637,565 and beginning of life data measured in the field. A reportable parameter table provides metrics that are more aligned with a traditional command/response type system which reports the value of input power, output power, gain, tilt of each repeater and span loss in the fiber between repeaters. Examples of an eLMS system and ASA algorithms are discussed in U.S. Pat. Nos. 10,637,565, 10,404,362 and 6,134,032, respectively, the contents of all three of which are incorporated herein by reference in their entirety.

However, modern undersea fiber systems utilize spatial division multiplexing signal modulation that use repeaters with amplifiers to transmit optical communication signals. The amplifiers are configured to share pumping lasers across fiber pairs and reduce the effects of one single pump laser being defective. A single defective pump laser may lead to a reduction to a fault signature, which may be missed by an ASA algorithm.

In addition, the new generation of undersea fiber optic communication transmission systems have recently been incorporating enhanced branching units (eBU) which are operable to change the optical communication path over which optical data communication signals are transmitted and thus the endpoints of the fiber pairs forming the original optical communication path may change when the switching happens. This real-time optical communication path reconfiguration by one or more eBUs brings new challenges to previous eLMS systems which now have to deal with dynamic optical communication path reconfiguration integrated into the previous static line monitoring systems.

Another problem may present itself, if a system is running on optical communication path X at the beginning of its life (e.g., when initially installed or initially set up) and switches to optical communication path Y at some later time, the system might miss detecting some faults that happened before the switching from optical communication path X to optical communication path Y because optical communication path Y is not monitored at the beginning of the system deployment, and thus errors may arise in the reportable parameter table reporting.

In addition, previous systems use one single fault detection algorithm in detecting optical faults. However, each different algorithm might have its own advantages in detecting faults with different amplitudes requiring increased complexity of design.

These problems are compounded by the fact that the complexity of fiber optic telecommunication systems is increasing rapidly, with more fiber pairs carrying more data. The number of fibers and the capacity supported by these systems will continue to increase for the foreseeable future, making accurate testing potentially even more time consuming.

BRIEF SUMMARY

In one aspect, an undersea optical communication transmission system performance evaluation device is provided. The system performance evaluation device may include a number of line monitoring equipment (LME) devices, a data storage, and a processor. The number of line monitoring equipment (LME) devices may be operable to determine operational performance of an undersea optical communication transmission system. Each LME device of the number of LME devices is positioned at terminal stations that form the undersea optical communication system. The data storage may be operable to store information related to the undersea optical communication transmission system. The processor may be coupled to the plurality of LME devices and operable to execute programming code that enables monitoring performance of the undersea optical communication system. The processor may be further operable to determine that an optical communication path in the undersea optical communication transmission system has been reconfigured. The reconfigured optical communication path is formed by coupling a plurality of segments of the undersea optical communication transmission system together enabling optical communication signal transmission, and the reconfigured optical communication path has a first endpoint and a second endpoint. The processor may obtain, from the data storage, system attributes of each respective segment of the plurality of segments from the first end point to the second endpoint of the reconfigured optical communication path. The processor may further evaluate the system attributes of each respective segment of the plurality of segments from the first end point to the second endpoint of the reconfigured optical communication path. A reportable parameter table may be generated based on the evaluated system attributes, where the reportable parameter table includes a listing of operational and structural parameters of system from the first endpoint to the second endpoint that form the reconfigured optical communication path.

In another aspect, a method for dynamically responding to an optical path switch is provided. The process may include receiving an indication, at a processor, that an enhanced branching unit has performed a switch that reconfigures at least one optical communication transmission path within an undersea optical communication transmission system. The reconfigured optical communication path may be operable to transmit data and includes a number of optical communication system components. An updated optical communication path name for the reconfigured optical communication path may be generated in a line monitoring path database. A reportable parameter table entry associated with the updated optical communication path name for the reconfigured optical communication path may be updated. The reportable parameter table entry may be updated by recalculating system attributes of the reconfigured optical communication path based on fault information related to each optical communication system component of the reconfigured optical communication path. Topology information related to the undersea optical communication transmission system may be modified to include the reconfigured optical communication path. A time related to a high loss loopback data set received by the line monitoring system manager may be evaluated with respect to a default time threshold of a baseline high loss loopback data set. In response to an evaluation of the time related to the high loss loopback data set failing to comply with the default time threshold of the baseline high loss loopback data set, the received high loss loopback data may be adopted as a new baseline high loss loopback data set.

In a further aspect, a configuration management system is provided. The configuration management system may include an undersea optical communication transmission system and a line monitoring system. The undersea optical communication transmission system may include line monitoring equipment, branching units and landing sites. The undersea optical communication transmission system may be operable to transmit optical communication signals along a plurality of optical communication paths. The line monitoring system may include a line monitoring system manager and a line monitoring system scheduler. The line monitoring system manager is coupled to the line monitoring equipment and is operable to receive system attributes from the line monitoring equipment. A network topology manager coupled to the branching units and the landing sites is also provided. The network topology manager is operable to receive topology information from each branching unit of the branching units and store the received topology information in an optical communication path database. A configuration management processor may be coupled to the line monitoring system and the network topology manager. The configuration management processor may be operable to obtain topology information from the network topology manager and obtain the system attributes from the line monitoring system manager, and a reportable parameter table database. The reportable parameter table database may include, for each optical communication path of the plurality of optical communication paths, a plurality of parameters calculated using the system attributes received by the configuration management processor.

DETAILED DESCRIPTION

Figure 1:
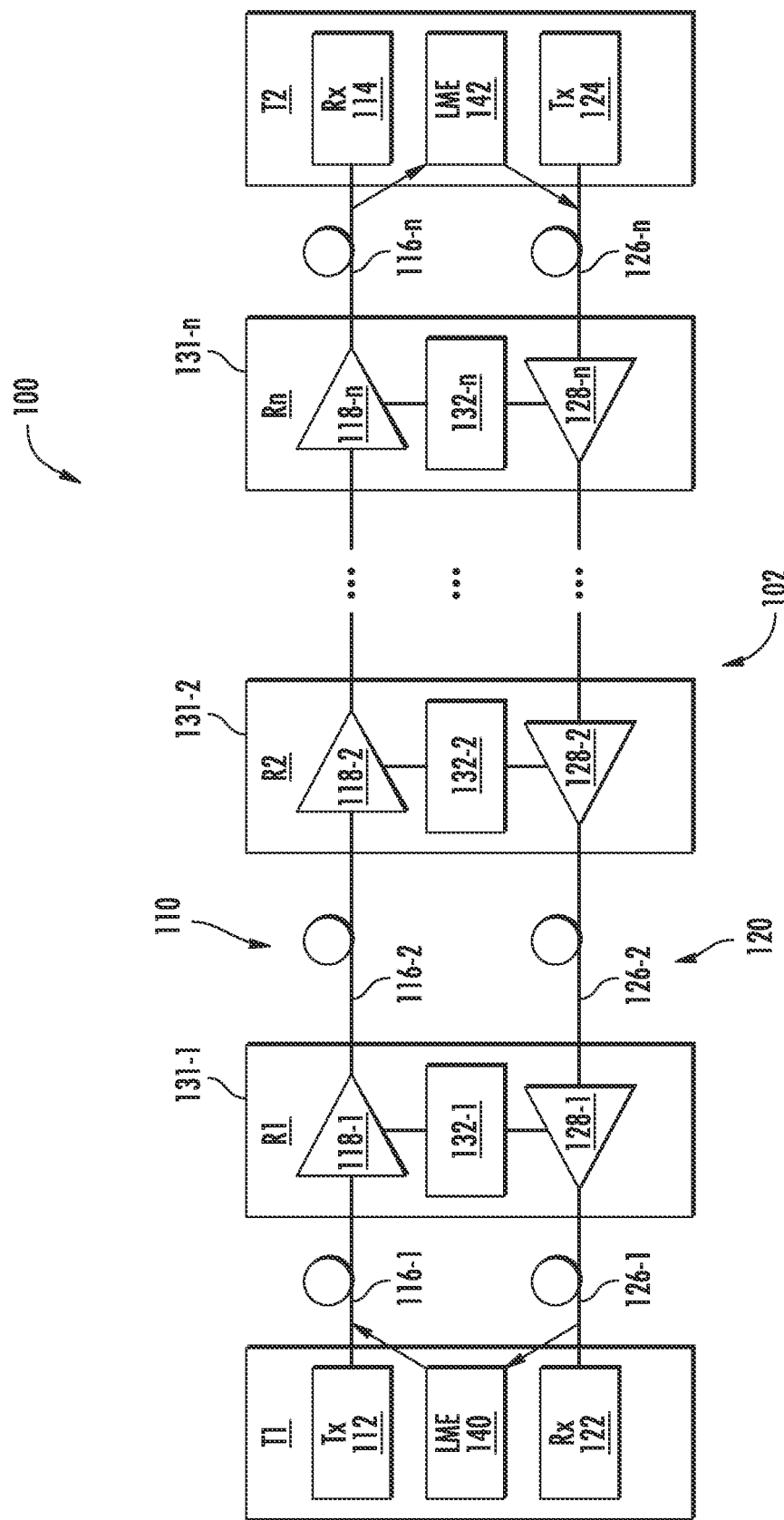
FIG. 1 illustrates an example of simplified block diagram of an undersea optical communication transmission system that includes a line monitoring equipment.

The following discussion describes advantageous techniques and systems that address the above problems faced by previous systems.

Incorporation of undersea optical switching in relation to HLLB-based line monitoring reconfiguration is a relatively new technological area.

The following discussion describes a system in which large volumes of data are processed and based on evaluation of system attributes (e.g., electrical characteristics of the constituent parts of an optical communication transmission system), identification and indications of the effectiveness of the reconfiguration of multiple subsystems of the optical communication transmission system may be provided.

Reconfiguration in such systems may need storage and access to thousands of optical communication transmission system configurations if a manual configuration management process is attempted and the results are often suboptimal performance and unacceptable reconfiguration times. For example, each branching unit of an optical communication transmission system adds a factor of 2 to the total number of possible optical communication paths that need to be processed in the reconfiguration. For a system with n branching units, the total number of possible paths is $2^n$ at least, which can make manual system administration of such optical switching systems intractable. Accordingly, a computer system is needed to maintain and manage the configuration and reconfiguration of the optical communication paths of the undersea optical communication transmission system.

Since an optical communication system may include tens or hundreds of optical fiber cable segments, each of which may include tens or hundreds of fiber optic pairs, the possible number of optical communication paths that may be configured and reconfigured in the optical communication system is a very large number, a number so large that the number of configurations may not be maintained or managed without use of a computer. For ease of discussion and illustration, the following examples refer to a reconfigured optical communication path, which may refer to one or more optical communication paths of the very large number of optical communication paths.

At a high level, the operational performance status of the undersea optical communication transmission system is monitored by a line monitoring system. The line monitoring system may be operable to perform testing that may automatically iterate over a plurality of channels for a fiber pair at a rate sufficient to characterize the fiber pairs of the plurality of channels. By automatically configuring the fiber optic communication system for testing on multiple optical communication channels with a respective fiber pair, downtime is reduced, and tests can be carried out on all, or substantially all, of the channels in each fiber pair of the cable. This may involve testing the entire usable spectrum, although small gaps in the tested spectrum are acceptable so long as the amount of spectrum that is tested is sufficient to infer the performance of the fiber pair over the entire usable spectrum. The performance may be compared against the optical communication transmission system requirements that the fiber pair is being tested against.

In addition to the problems mentioned in the background, additional problems with these large optical communication transmission systems that include branching units is the difficulty in making sure the line monitoring system knows which optical communication path is being used in the transmission of data (i.e., which optical communication path is an "active" optical communication path).

Advantages and benefits of the disclosed techniques, devices and systems includes providing an enhanced line monitoring system (eLMS) that is operable to: automatically reconfigure beginning of life data when a branching unit optical switch occurs, automatically reconfigure line monitoring system (LMS) path databases in response to optical path changes as well as related line monitoring equipment (LME) hardware operational provisioning parameters, automatically reset the LMS baseline of the new path (i.e., reconfigured optical communication path) after an optical switch to avoid the influence of loading changes, and automatically reschedule previously scheduled LMS measurements.

In addition, the described systems are operable to create the beginning of life (BOL) data by manual creation for one of the permutations, dynamically calculate beginning of life data for the other (e.g., later) permutations, maintain monitoring of detected faults by maintaining the detected fault in a database and creating a reportable parameter table database showing the differences between the manual BOL and the dynamically created BOL. The described system may also be able to configure how the system will detect faults. As explained in more detail with reference to one or more examples, the system is able to provide cross fiber validation that provides more accurate analysis and enables individual faults to be correlated. Previous systems do not provide cross fiber validation and individual faults are not correlated. A further advantage of the disclosed systems and techniques is the ability to detect multiple faults at the same position and at nearby positions of which the fault signatures overlap. Past line monitoring systems were configured manually. The disclosed examples enable at most one set of beginning of life data corresponding to one permutation of the optical communication paths having to be manually configured to populate a topology of the optical communication transmission system and thus saves a lot of time and expense needed for manually configuring all permutations of optical paths. The line monitoring systems described with reference to the following examples is automatically configured. In addition, the presently disclosed techniques and system enable measurement scheduling to be automatically reconfigured on each associate LMP path that changes due to an optical switch.

In addition, a voting algorithm is described that offers consistent reporting for shared pumps across fiber pairs, even if the newly configured optical communication paths end with different cable station terminations (e.g., a landing site). The described techniques, devices and systems also support simultaneous multiple fiber pair optical reconfiguration when multiple optical communication path changes occur simultaneously.

Reference is now made to the drawings, wherein like reference numerals are used to refer to like elements throughout. In the following description, for purposes of explanation, numerous specific details are set forth in order to provide a thorough understanding thereof. However, the novel examples can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates an example of simplified block diagram of an undersea optical communication transmission system that includes line monitoring equipment. When a fiber optic communication transmission system is deployed, it is generally tested to ensure that it performs as expected. The results of the testing may be maintained as beginning of life data that also enables the setting of a system baseline.

In general, a system and method consistent with the present disclosure provide for an automated line monitoring system (LMS) baselining function that enables capturing and updating of operational parameters specific to each repeater, associated undersea components and the like using high loss loopback (HLLB) data. The captured operational parameters may then be utilized to satisfy queries targeting specific undersea elements in a Command-Response (CR) fashion. Therefore, command-response functionality may be achieved without the added cost, complexity and lifespan issues related to deploying undersea elements with on-board CR circuitry. As generally referred to herein, operational parameters include any parameter that may be derived directly or indirectly from HLLB data. Some example, non-limiting examples of operational parameters include span gain loss, input power, output power, gain, and gain tilt.

FIG. 1 is a simplified block diagram of one exemplary embodiment of optical communication transmission system 100 consistent with the present disclosure. In general, the optical communication transmission system 100 may be configured to calculate a loop gain value associated with each repeater/amplifier using LMS signals sent from both ends of a bi-directional transmission path 102. Those of ordinary skill in the art will recognize that the system 100 has been depicted as a highly simplified point-to-point system form for ease of explanation. It is to be understood that a system and method consistent with the present disclosure may be incorporated into a wide variety of network components and configurations. The illustrated examples herein are provided only by way of explanation, not of limitation.

As shown, the optical communication transmission system 100 may include a first terminal T1 and second terminal T2 coupled by two unidirectional optical paths 110, 120, which together form the bi-directional optical transmission path 102. The first terminal T1 is coupled to a first end of the transmission path 102 and the second terminal T2 is coupled to a second end of the transmission path 102.

The optical path 110 may carry optical data on a number of channels (or wavelengths) in one direction from a transmitter 112 in the terminal T1 to a receiver 214 in the terminal T2. The optical path 120 may carry optical data on a number of channels (or wavelengths) in a direction opposite from the direction associated with path 110 from a transmitter 124 in the terminal T2 to a receiver 122 in the terminal T1. With respect to terminal T1, the optical path 110 may be an outbound path and the optical path 120 may be an inbound path. With respect to terminal T2, the optical path 120 may be an outbound path and the optical path 110 may be an inbound path. The optical path 110 may include an alternating concatenation of optical fibers 116-1 to 116-$n$ and optical amplifiers 118-1 to 118-$n$, and the optical path 120 may include an alternating concatenation of optical fibers 126-1 to 126-$n$ and optical amplifiers 128-1 to 128-$n$.

The optical path pair (e.g., optical paths 110, 120) may include sets of amplifier pairs 118-1 to 118-$n$ and 128-1 to 128-$n$ disposed within housings 131-1 to 131-$n$ of associated repeaters R1 . . . Rn and connected by pairs of optical fibers 116-1 to 116-$n$ and 126-1 to 126-$n$. The pairs of optical fibers 116-1 to 116-$n$ and 126-1 to 126-$n$ may be included in an optical fiber cable together with fibers supporting additional path pairs. Each repeater R1 . . . Rn may include a pair of amplifiers 118-1 . . . 118-$n$ and 128-1 . . . 128-$n$ for each supported path pair. Optical amplifiers 118-1 . . . 118-$n$ and 128-1 . . . 128-$n$ are illustrated in simplified form may include, for example, one or more erbium doped fiber amplifiers (EDFAs), or other rare earth doped fiber amplifiers, Raman amplifiers or semiconductor optical amplifiers. A HLLB path 132-1 to 132-$n$ may be coupled between optical paths 110, 120, for example, in one or more of the housings 131-1 to 131-$n$ of the repeaters R1 . . . Rn, and may include, for example, one or more passive optical coupling components.

The line monitoring equipment (LME) 140, 142 may be located at both of the terminals T1, T2 to provide HLLB monitoring of the path pair of optical paths 110, 120. The LME 140 may launch one or more LME test signals, e.g., at different wavelengths and/or different frequencies, into one optical path 110 (e.g., an outbound optical path from terminal T1). Each of the HLLB paths 132-1 to 132-$n$ may couple a sample of the LME test signals propagating in optical path 110 into the forward propagating direction of the other optical path 120 (e.g., an inbound optical path to terminal T1). The LME 140 may then receive and measure the samples to detect changes in loop gain as an indication of a fault in the system. The received samples of the LME test signals received through HLLB paths 132-1 to 132-$n$ in response to LME test signals are referred to herein as HLLB loopback data, or simply, loopback data.

The LME 142 may launch one or more LME test signals, e.g., at different wavelengths and/or different frequencies, into one optical path 120 (e.g., an outbound optical path from terminal T2). The HLLB paths 132-1 to 132-$n$ may couple a sample of the LME test signals propagating in optical path 120 into the forward propagating direction of the other optical path 110 (e.g., an inbound optical path to terminal T1). The LME 142 may then receive and measure the samples (i.e., loopback data) to detect changes in loop gain as an indication of a fault in the system. A variety of transmitter and receiver configurations for the LME 140, 142 for transmitting LME test signals and receiving and measuring loopback data are known.

A variety of HLLB path configurations useful in a system consistent with the present disclosure are known. Also, although the each of the repeaters R1 . . . Rn is shown as having an associated HLLB path 132-1 to 132-$n$, the HLLB paths may be located in other locations and/or may not be located in every repeater R1 . . . Rn. In some embodiments, the HLLB paths 132-1 to 132-$n$ may be symmetric in operation, i.e., the function that describes the percent of optical power at each wavelength transferred from optical path 110 to optical path 120 by a HLLB path 132-1 is the same as the function that describes the percent of optical power at each wavelength transferred from optical path 120 to optical path 110 by the HLLB path 132-1. Alternatively, one or more HLLB paths may not be symmetric and different HLLB paths may have different transfer functions.

Figure 2:
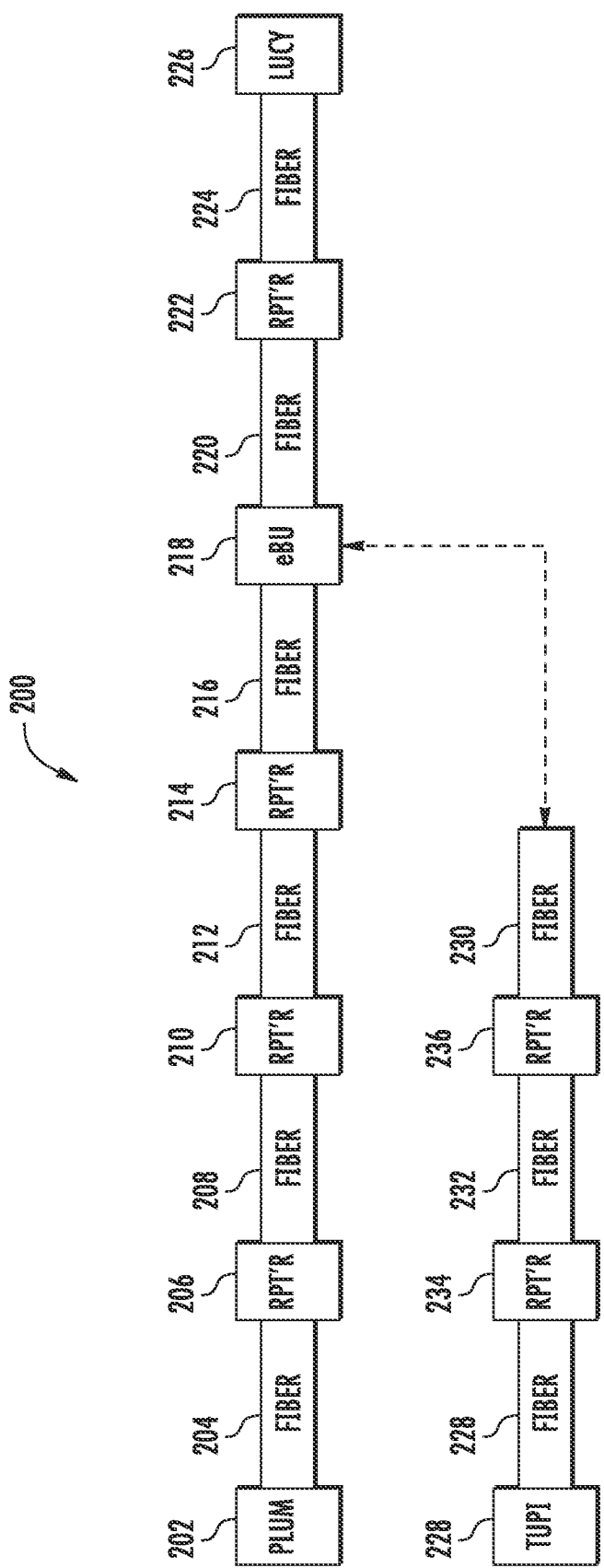
FIG. 2 illustrates an example of a bi-directional, undersea optical communication transmission system that incorporates a branching unit suitable for implementation of the techniques and systems described herein.

FIG. 2 illustrates an example of a bi-directional, undersea fiber optic telecommunication system that uses high-bandwidth fiber optics to transmit vast amounts of data over long distances that may be monitored by using the techniques and systems described herein.

undersea optical cables are laid on the seabed or ocean floor between land-based terminals to carry optical signals across long stretches of ocean and sea. This configuration presents a number of unique challenges, especially when it comes to managing configurations since many of the components in such a system are located on the ocean floor many miles away from land and cannot be readily accessed for configuration or assessment. The optical cables typically include several optical fiber pairs and other components such as strengthening members, a power conductor, an electrical insulator and a protective shield. The optical fibers may be single core/mode fibers or multi-mode/core fibers. The first fiber of a fiber pair may be coupled in the system for communicating signals in a first direction (e.g., outbound) on the cable and the second fiber of the fiber pair may be configured for communicating signals in a second direction, opposite the first direction (e.g., inbound), on the cable to support bi-directional communications.

In a branched undersea optical communication system, a trunk cable may extend between first and second land-based trunk terminals. The trunk cable may include a number of trunk cable segments coupled between optical amplifiers for amplifying the optical signals and may have one or more branching nodes coupled thereto. Each branching unit may be connected to a branch cable that terminates in a transmitting and/or receiving land-based branch terminal. The branch cable may include a number of branch cable segments coupled between optical amplifiers for amplifying the optical signals.

Bi-directional data transmission may be implemented by constructing pairs of optical fiber paths within the cable and transmitting modulated optical data signals over a number of channels per optical fiber pair. The optical communication transmission system 200 may, for example, be a bi-directional fiber optic communication transmission system that includes elements or components similar to those described above with reference to FIG. 1.

As shown in the example of FIG. 2, the optical communication transmission system 200 includes 3 landing stations (or landing sites) (i.e., PLUM 202, LUCY 226 and TUPI 228) and one enhanced branching unit (eBU) (i.e., eBU 218). A trunk cable, which is a cable or a plurality of segments of a cable, may extend from a first landing site (e.g., PLUM 202) may be made up of a number of segments of the undersea optical communication transmission system, such as the respective fibers 204, 208, 212, 216, 220 and 224 and repeaters 206, 210, 214, and 222 as well as enhanced branching unit (eBU) 218 to a second landing site, such as LUCY 226.

A branch from the eBU 218 in the optical communication transmission system 200 may couple to segments of the undersea optical communication transmission system, such as respective fibers 230, 232 and 238 that extend from the eBU 218 in the trunk (e.g., an optical fiber cable or segments of an optical fiber cable) to landing site TUPI 228. Similar to the optical fiber cables already mentioned, each respective fiber 230, 232 and 238 may include a number of pairs of fiber optic cables (the pair of fiber optic cables are arranged for bi-directional communication (one fiber optic for data transmission in a first direction and another fiber optic for data transmission in a second direction that is different from the first direction). The eBU 218 may also include a number of ports to which the pairs of fiber optics are coupled, and each of the respective pairs of fiber optic cables is coupled to a designated port. The designation of the respective ports of the eBU 218 may be maintained in an internal connection table by a processor of the eBU 218. An example of the port designations is described in a later example.

In an example, the landing sites PLUM 202, LUCY 226 and TUPI 228 may be configured similar to terminals T1 or T2 of FIG. 1. The respective repeaters 206, 210, 214, 218, 222, 234 and 236 may be configured similar to repeaters 131-1 to 131-$n$. While HLLB paths, such as 132-1 to 132-$n$, are present in or coupled to the respective repeaters 206, 210, 214, 218, 222, 234 and 236, the HLLB paths are not shown in FIG. 2 for ease of illustration. In addition, while also not specifically shown in FIG. 2, each of fibers 204, 208, 212, 216, 220, 224, 238, 232 and 230 may include at least a pair of optical fibers that are operable to provide bi-directional communication between a first landing site and a second landing site, e.g., PLUM to LUCY, LUCY to TUPI, TUPI to PLUM, combinations thereof, or the like. It is envisioned that the number of fiber pairs in each of the respective fibers 204-230 may include up to 12, 24 or 32 fiber optics for data transmission. Each fiber optic of a fiber pair may also include a number of individual communication channels separated in different spectral wavelengths.

The optical communication transmission system 200 has been depicted in highly-simplified form for ease of explanation. In a real-world implementation, the optical communication transmission system 200 may be configured as a long-haul optical communication system, e.g., having a length of more than about 600 km between at least two of the landing sites and which spans an ocean or other body of water.

In such a real-world implementation, the repeaters 206, 210, 214, 218, 222, 234 and 236 may include amplifiers that may be configured, in an example, to utilize a single laser pump to amplify the optical communication signals input into the respective repeaters.

In an example, an optical communication path may be actively transmitting optical communication data from PLUM 202 to LUCY 226. The eBU 218 may be operable to receive a control signal from a remote control system or client device (shown in a later example) coupled at one or more of the landing sites, PLUM 202, LUCY 226 or TUPI 228, that causes one or more optical switches (not shown in this example) in the eBU 218 to switch one or more of the fiber optics in fiber 216 or fiber 220 to generate a reconfigured optical communication path. In the example, the eBU 218 may receive a control signal from the remote control system that causes optical switches in the eBU 218 to reconfigure the optical communication path from PLUM 202 to LUCY 226 to, for example, PLUM 202 to TUPI 228. The reconfigured optical communication path may be referred to as the PLUM-TUPI optical communication path. Note that fiber 230 is also coupled to the eBU 218.

A configuration management system may respond to the creation of the reconfigured optical communication path by updating different systems and databases with information related, for example, to the reconfigured optical communication path, PLUM-TUPI. The creation of the reconfigured optical communication path may be indicated by the eBU 218 in response to: the actuation of the optical switch to create the reconfigured optical communication path, receipt of the control signal that causes creation of the reconfigured optical communication path, or generation of an acknowledgement signal that the requested switch was performed or receipt of the control signal.

Examples of configuration management actions taken by a configuration management system may be described with reference to the examples of FIGS. 3A and 3B in which eBU 218 performs the optical switch to create the reconfigured optical communication path.

Figure 3A:
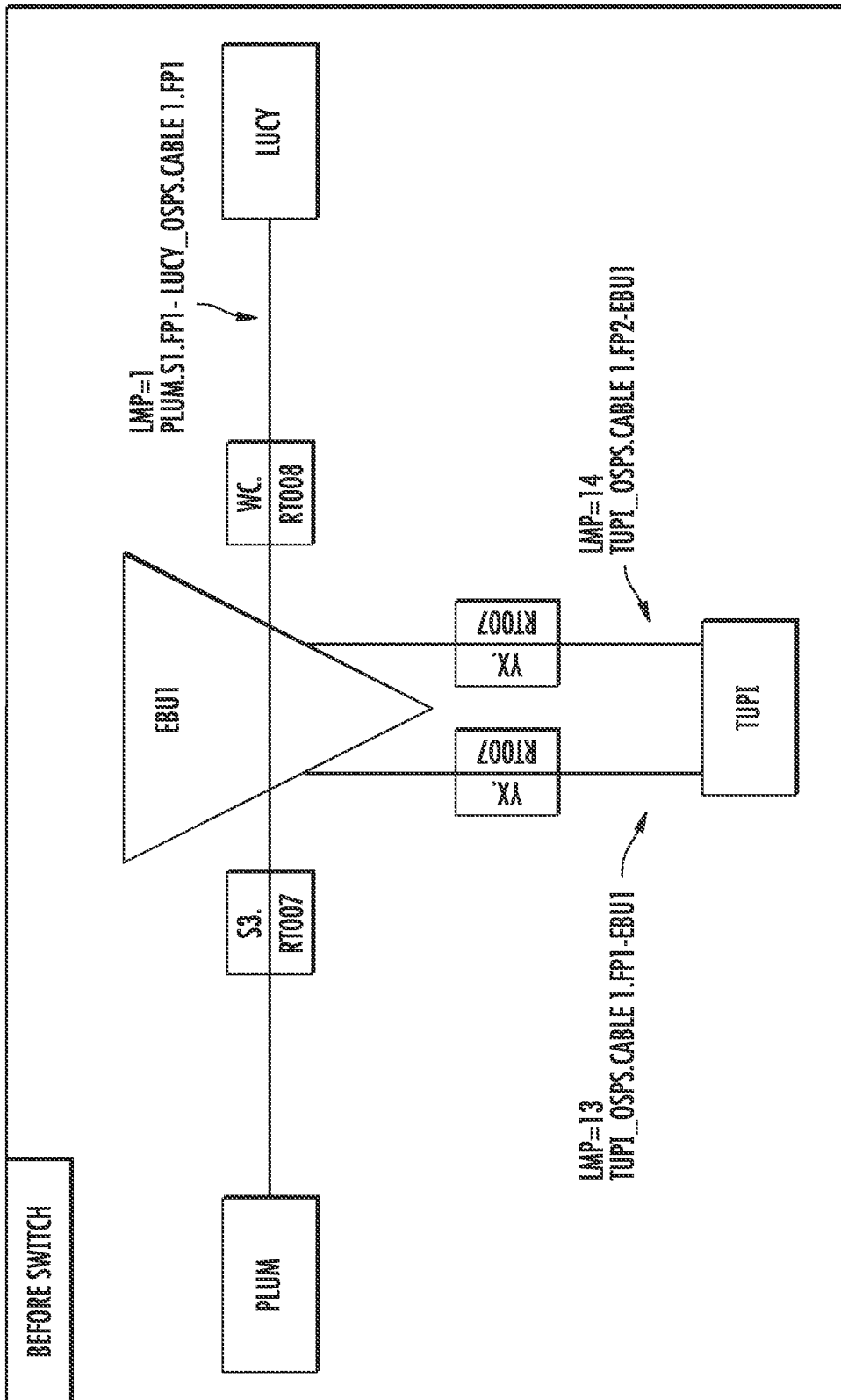
FIG. 3A illustrates an example of switching configuration of the branching unit shown in the example of FIG. 2.

FIG. 3A illustrates an example of switching configuration of the branching unit shown in the example of FIG. 2. The state of an eBU such as eBU 218 and the optical communication path is shown prior to a switch. FIG. 3A shows how the dynamic path switch may operate. Before the switch, the eBU 1 is in all trunk mode in which landing site PLUM is connected directly to landing site LUCY and two line monitoring paths LMP 13 and LMP 14 starting from TUPI end at the eBU 1. The trunk from landing site PLUM to landing site LUCY may be assigned a line monitoring path designation of LMP 1. In addition, the line monitoring system database and/or topology database may further reference the line monitoring path LMP 1 using an optical communication path name, such as PLUM.S1.FP1-LUCY_OSPS.Cable1.FP1. The reference in the respective database may indicate different information related to the segments of the undersea optical communication transmission system coupled to each of the respective landing sites, PLUM and LUCY. After a fiber switch is made on eBU1, the fiber connections between landing site PLUM and landing site LUCY may change, for example, a fiber optic cable or an optical fiber within the fiber optic cable from landing site PLUM may be connected to landing site TUPI and a fiber optic cable or an optical fiber within the fiber optic cable from landing site TUPI is connected to landing site LUCY.

Figure 3B:
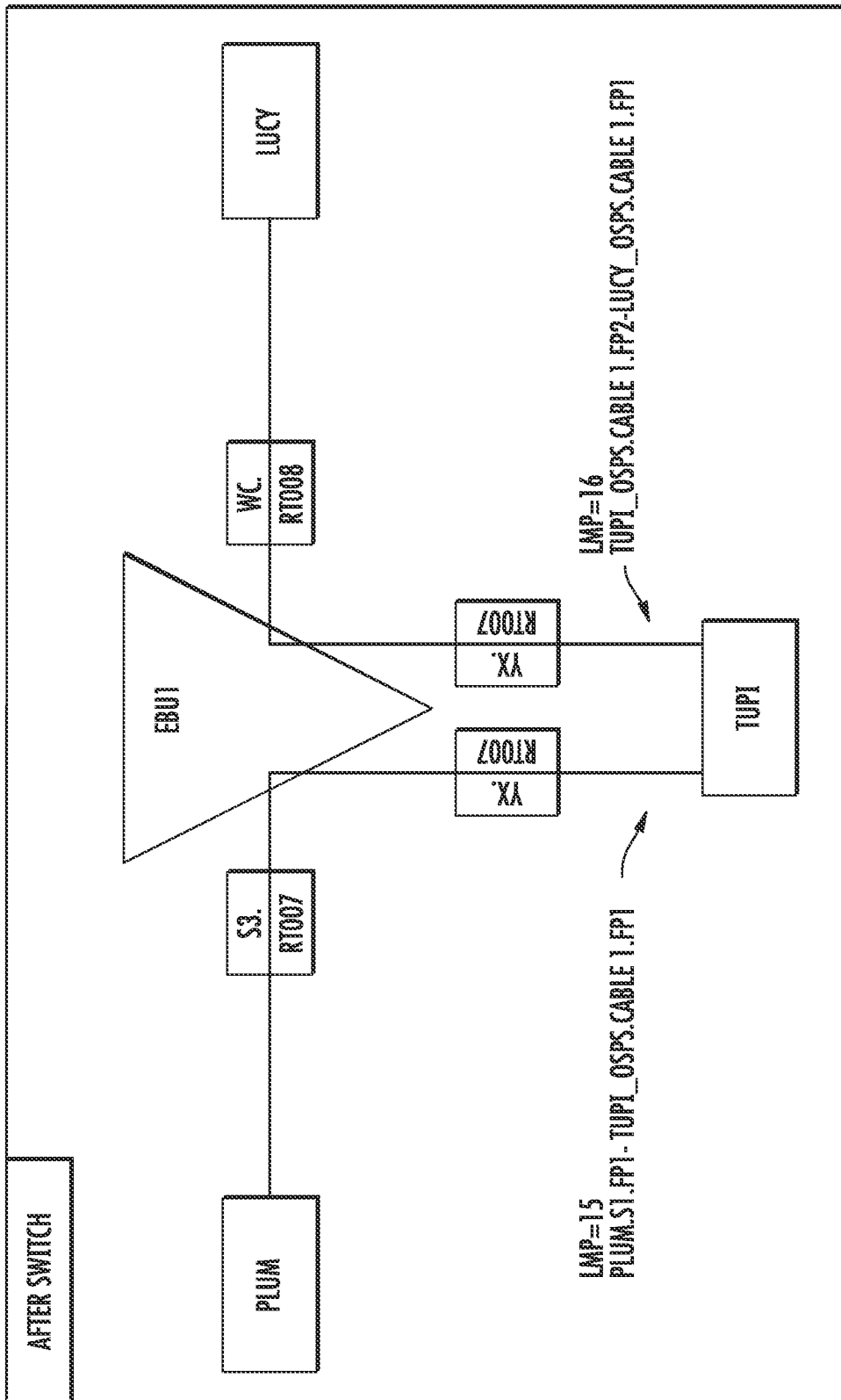
FIG. 3B illustrates an example of updating various configuration management databases in response to creation of a reconfigured optical communication path by the branching unit.

FIG. 3B illustrates an example of updating various configuration management databases in response to creation of a reconfigured optical communication path by the branching unit. The state of an eBU such as eBU 218 and the optical communication path is shown after the switch. In the example with reference to the elements of FIG. 2, the fiber connection after the eBU 218 switch forms a pair of reconfigured optical communication paths, in which landing site PLUM 202 is connected to landing site TUPI 228 and landing site TUPI 228 is connected to landing site LUCY 226. Each reconfigured optical communication path of the pair of reconfigured optical communication paths is provided with a line monitoring path designation and/or an optical communication path name.

As discussed with reference to later examples, the new optical configuration (i.e., reconfigured optical communication path) may be automatically detected. For example, an internal line monitoring system reconfiguration indication may be triggered that also causes reconfiguration of LMS scheduling for the making of automated measurements and line monitoring paths may be reconfigured for analysis of multiple pumping lasers that are shared on the respective line monitoring paths (LMPs) via an enhanced automatic signature analyzer.

FIG. 4 illustrates a functional diagram representing an example of an internal routing table of the eBU1 that is representative of the examples of FIGS. 2, 3A and 3B before a switch. The internal routing table of eBU 1 before the switch may indicate that landing site PLUM is connected to landing site LUCY and landing site TUPI ends with at the eBU1 as also shown in FIG. 3A. In the eBU1, the topology table maintained in the eBU1 shows the line monitoring system designation of the optical communication path from the landing site of PLUM to landing site LUCY as being line monitoring path, LMP1. The line monitoring system designation of the optical communication path from landing site TUPI to the eBU1 is shown for a first fiber pair, fiber pair 1 (PF1), to be the line monitoring path 13 (LMP13) and for a second fiber pair, fiber pair 2 (PF2), to be the line monitoring path 14 (LMP14). When a switch is made at the eBU1, the internal routing table of eBU1 may be updated dynamically and automatically. For example, the dynamic update of the internal routing table may be made upon receipt of a command signal received from a remote control unit (not shown), a client device (as shown in another example) or the like.

Figure 4A:
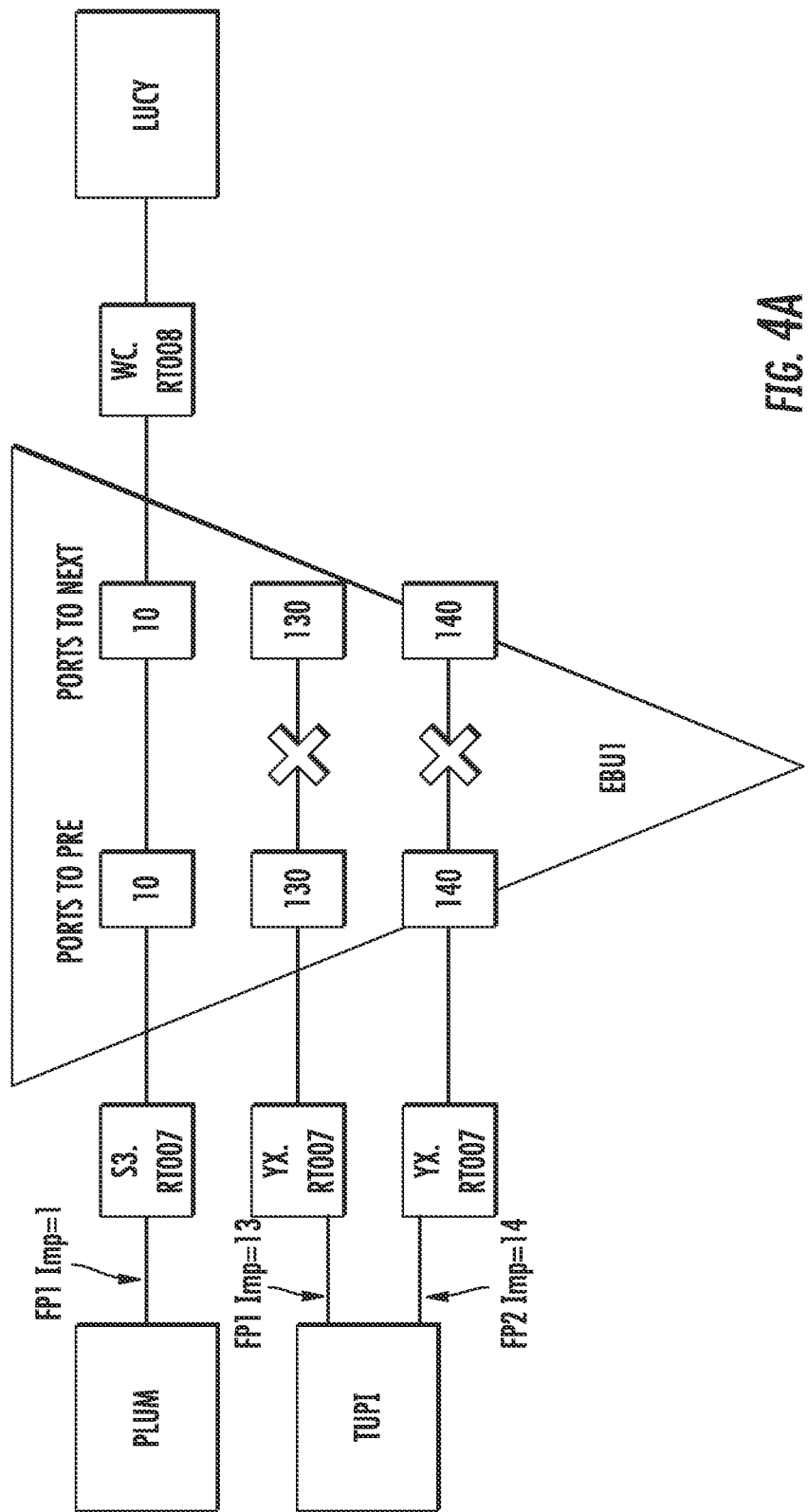
FIG. 4A illustrates an aspect of the subject matter in accordance with one embodiment.
Figure 4B:
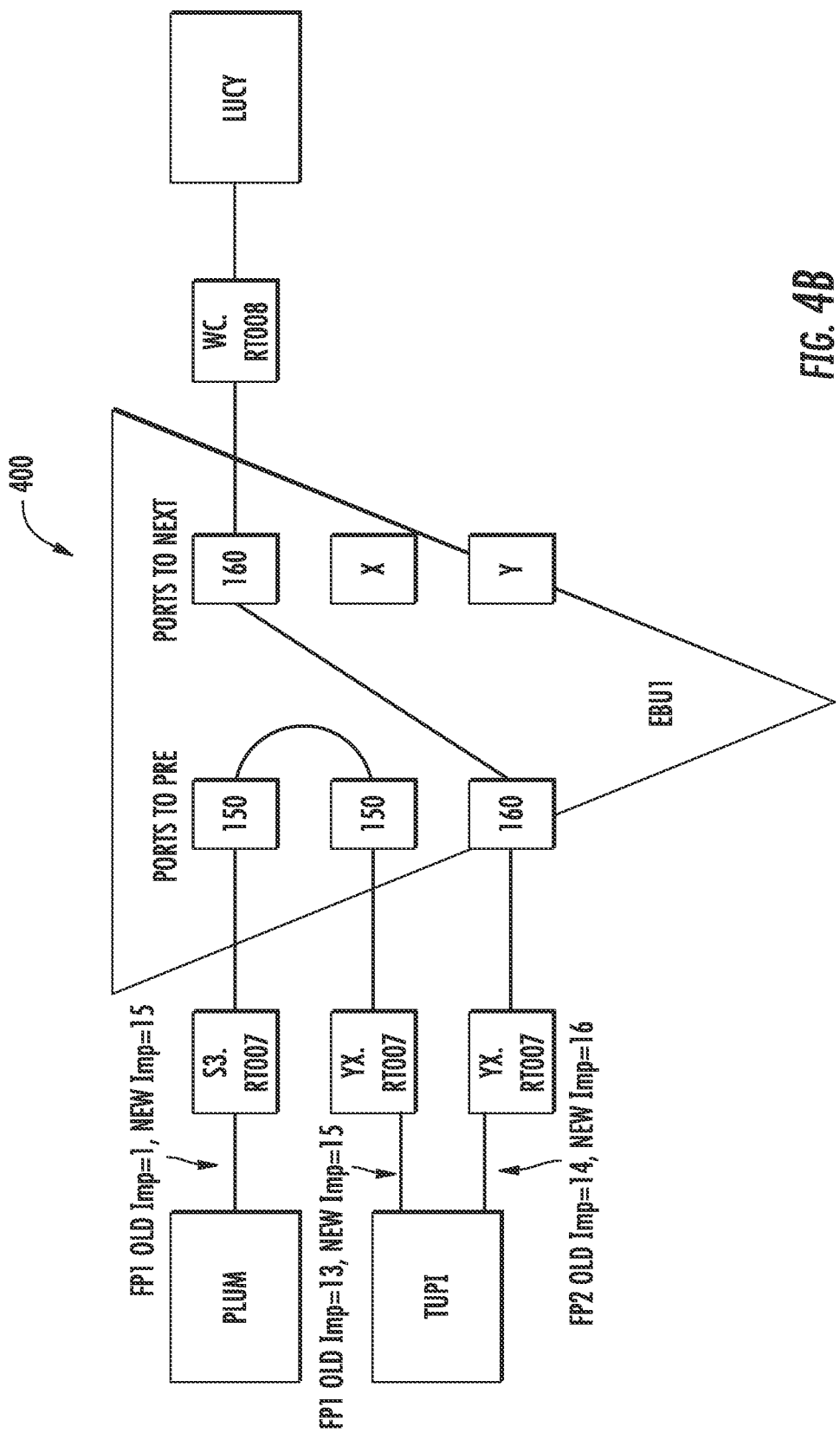
FIG. 4B illustrates an example of modifications made by configuration management system components in response to reconfigured optical communication path generated by the example eBU switch described in the examples of FIGS. 3A and 3B.

FIG. 4B illustrates an example of modifications made by configuration management system components in response to reconfigured optical communication path generated by the example eBU switch described in the examples of FIGS. 3A and 3B.

The internal routing table of eBU before the switch may indicate that landing site PLUM is connected to landing site LUCY and landing site TUPI ends with the eBU, i.e., eBU 1, as shown in FIG. 3A.

In FIGS. 4A and 3B, the old LMP 13 was the optical communication path name for the segment segments of the undersea optical communication transmission system that extended from landing site TUPI to the eBU1 before the switch. After the switch by the eBU 1 that generates the reconfigured optical communication path, the optical communication path name of the reconfigured optical communication path is PLUM-EBU1-TUPI, so the inbound and outbound parameters like gain and gain tilt need to be swapped as the configuration changed.

In addition to updating a topology table, the configuration management processor and a line monitoring system (LMS) manager may be apprised of updated port designations at the eBU1. For example, one or all of the configuration management processor, the LMS manager, or a processor at the eBU1 may be operable to generate updated port names for the ports of the eBU1 affected by the generation of the reconfigured optical communication path. In the example illustrated in FIG. 4B that enable the new PLUM-EBU1-TUPI need to be given an updated name. An example process for re-calculating the ports may, for example, use "LMP*Shift Factor+Band", where Shift Factor=10 and band=0 (C band) or 1 (L band). Basically, the shift factor is used to generate updated LMP port numbering as shown in the example in FIG. 4B. For example, since the LMP connecting PLUM to TUPI has been designated as LMP 15, the port designation to which each of the respective fiber pairs coupled to PLUM and TUPI couple to the eBU1 at port 15*10+0 (C Band)=150. Similarly, since the LMP for the TUPI to LUCY optical communication path has been given the optical communication path name 16, the port designation at which each of the respective fiber pairs couple to TUPI and LUCY at the eBU1 may be port designation port 16*10+0 (C Band)=160.

After the new routing table is generated, the LMS may perform the above as well as additional functions that are described with reference to the other examples. For example, FIG. 5 illustrates a process implemented by a configuration management processor to perform the disclosed functions.

Figure 5:
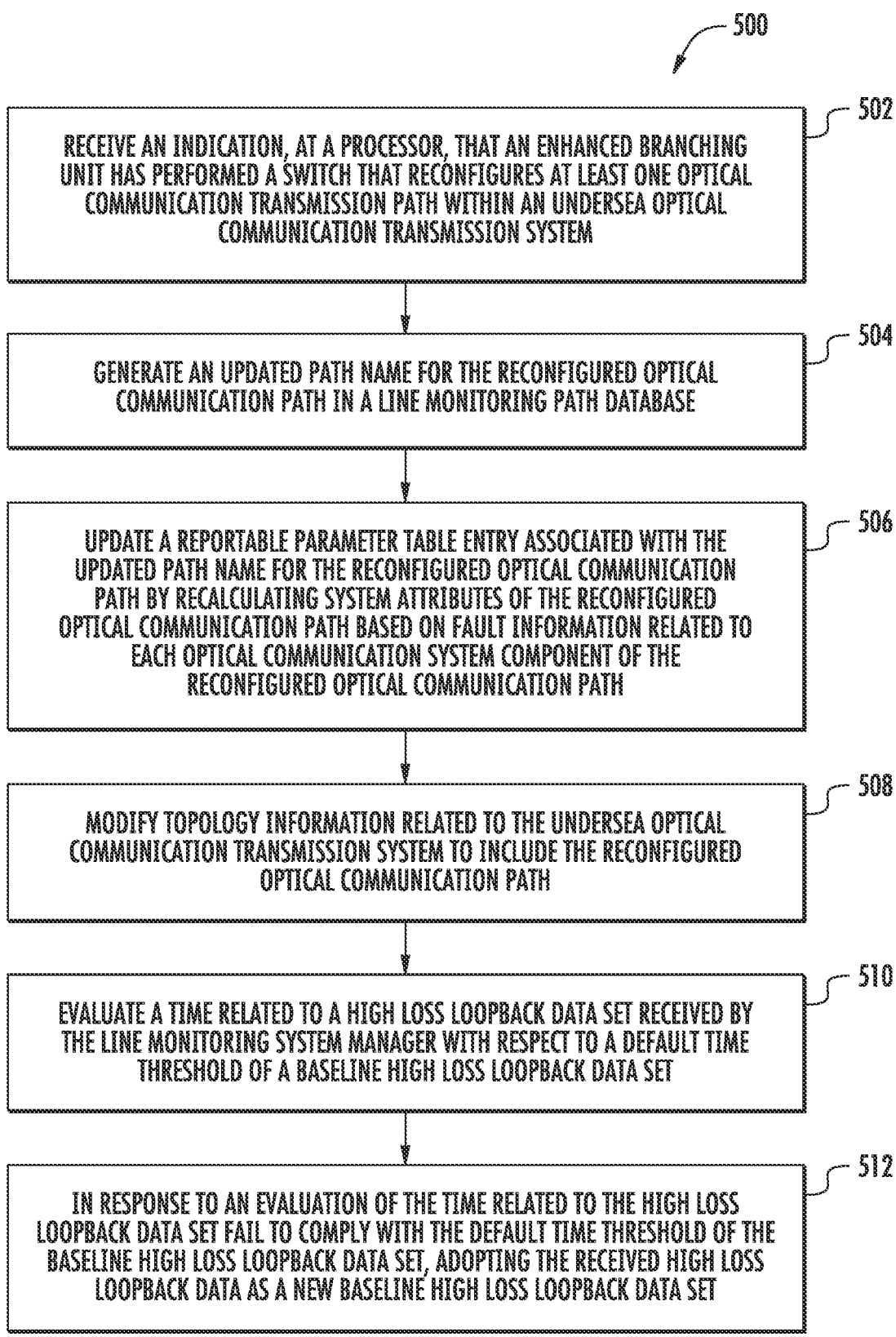
FIG. 5 illustrates a process 500 in accordance with one embodiment.

FIG. 5 illustrates an example of a configuration management process that occurs in response to the generation of a reconfigured optical communication path. For example, in response to the generation of the reconfigured optical communication path, the processor may be operable to perform the following functions as part of the process 500.

In block 502, a processor executing the process 500 may receive an indication that an enhanced branching unit has performed a switch that reconfigures at least one optical communication transmission path within an undersea optical communication transmission system. For example, the received indication may be a fiber connection table obtained from the at least one branching unit indicating a change of an optical switch state of the at least one branching unit. In the example, the fiber connection table identifies connections made by the at least one branching unit between segments of fiber optic cables and pairs of optical fibers within each respective segment of the segments of fiber optic cables coupled to the at least one branching unit.

The reconfigured optical communication path may be operable to transmit data via optical communication signals and includes a number of optical communication system components. For example, the number of optical communication system components may include at least one or more of or a combination of an updated landing site, an updated segment of a fiber optic cable, another enhanced branching unit or an updated fiber pair within a fiber optic cable. The received indication sent by the enhanced branching unit may be an indication of a change to a fiber connection table. For example, the fiber connection table may be maintained by a processor collocated with, or coupled to, the enhanced branching unit.

The functions may include updating the path name in the LMP with reference to a topology table. In block 504, the process 500 generates an updated optical communication path name for the reconfigured optical communication path in a line monitoring path database.

The processor may also be operable to recalculate the topology for the SDM group and upload the topology information. In some examples, the processor, prior to establishing the reconfigured optical communication path, may be operable to calculate an individual high loss loopback data baseline for each optical communication path within the line monitoring system. For example, when a new high loss loop back dataset is sent to the LMS for analysis, the LMS is operable to examine, for example, the date and/or timestamp of the baseline high loss loopback (HLLB) data and if it is not set or is set previous to a default time threshold, the processor may adopt the new HLLB data as the new baseline.

In block 506, the process 500 updates a reportable parameter table entry associated with the updated optical communication path name for the reconfigured optical communication path. The reportable parameter table entry includes system attributes of the reconfigured optical communication path that are recalculated based on fault information related to each optical communication system component of the reconfigured optical communication path.

For example, some components of the reconfigured optical communication path of PLUM-eBU1-TUPI may have fault information that was collected and saved when some of the components were used in other optical communication paths. In addition, a reportable parameter table (RPT) table that is stored in a reportable parameter table database may be recalculated, for example, for the space division multiplex (SDM) optical communication signals influenced by the switch and the generated reconfigured optical communication path.

For example, the processor may be operable to retrieve fault information related to each repeater of the number of repeaters, each fiber span of a number of spans and system attribute information related to the at least one branching unit and each line monitoring device of the number of line monitoring devices. The fault information includes at least one of span loss and pump degradation and the system attribute information includes at least one of a distance, a signal loss, an input power, a gain, an output power or a gain tilt or a combination. It should be noted that span loss may be defined as signal loss that of a fiber span that is between two repeaters. Span loss and a span loss fault differ in that a span loss fault is a change of span loss or additional span loss added to the beginning of life span loss.

Each component of the undersea optical communication transmission system is subject to measurements from which are obtained system attributes that characterize the respective component. These system attributes may be referred to as beginning of life (BOL) data. Beginning of life data may be described as measured data characterizing the system design and may include parameters such as input power, output power, gain, span gain loss, spectral tilt, distance, or the like. In an example, the power at a first enhanced branching unit, such as eBU 218, may be known and may be considered beginning of life data. In some examples, distance may also be considered beginning of life data to describe the distance between repeaters and/or unbundled network elements (UNE).

As discussed with reference to FIG. 6, the line monitoring system may maintain a database of line monitoring paths. The database of line monitoring paths may be a data structure that maintains the measurements of the line monitoring equipment (LME) for each respective line monitoring path. The line monitoring path data may include distances between respective repeaters, characteristic data of the respective line monitoring equipment in the line monitoring path (because LME hardware (multi-side tone signals outside the payload channels of the optical signals) may need to be reconfigured to communicate with line monitoring equipment introduced due to a switch in optical path (e.g., a change from PLUM/LUCY to PLUM/TUPI or to LUCY/TUPI of FIG. 2).

In an example, the recalculation of the system attributes may be done by recalculating beginning of life (BOL) data for the reconfigured optical communication path. In an example, the LMS may be operable to examine a database to see whether the RPT has been installed before or not. If the BOL data is installed, the RPT may be inserted as new internal reference, otherwise, the BOL data may be installed together with the new internal reference, thus preserving the fault information of system components that have been monitored. As a result, when a new LMP is generated in response the creation of the reconfigured optical communication path, fault data associated with system components within the previous LMP is maintained so as to keep an accurate portrayal of the system configuration.

Examples of components in undersea optical communication transmission systems may include repeaters, splice elements, amplifiers, optical fiber and/or optical cable couplers, optical switches and other components within or usable for coupling optical fibers to branching units, or other components. During the planning for the optical communication system, the components (e.g., repeaters, splice elements, branching units and the like) that make up the optical communication transmission system or portion thereof may be identified. For example, measurements, such as signal loss values in a specific repeater, a cable segment, an enhanced branching unit and the like, of operational performance characteristics of components used in the construction of an optical communication system or a portion of an optical communication system may be made.

Each of the components of an undersea optical communication transmission system, such as 200, may have system attributes associated with it in a database (described in more detail with reference to a later system example). The system attributes may be generated by components of a line monitoring system in response to HLLB data and/or may be based on measurements made prior to installation of the respective component in the optical communication transmission system. The HLLB data received after manufacture and/or measurements made prior to installation may be referred as beginning of life (BOL) data. The BOL data may include different types of data that enables characterization of system components related to the operational performance of the optical communication system.

When an eBU switch is performed, the entries in the RPT table and BOL data may be dynamically recalculated using the information stored in the topology. Also, because fault information like span loss and pump degradation are maintained in the RPT table per device (i.e., on a device or component basis), when an optical switch is performed by a branching unit, the fault information is preserved within the time gap between the initial deployment and the switch performed by a branching unit for any affected line monitoring path.

In block 508, the process 500 modifies topology information related to the undersea optical communication transmission system to include the reconfigured optical communication path. For example, and with reference to FIGS. 3A-B, in order to track the optical switch state changes, the eBU node (i.e., eBU 1) maintains a fiber connection table before the switch, as shown in FIG. 2. When a switch is made at the eBU 1, the switch information is passed to the LMS so that an internal fiber connection table (also referred to as a topology database) is changed to FIG. 3A.

In block 510, the process 500 evaluates a time, such as a date or time stamp, related to a high loss loopback data set received by the line monitoring system manager with respect to a default time threshold of a baseline high loss loopback data set.

In block 512, the process 500 in response to an evaluation of the date or time stamp of the time related to the high loss loopback data set fails to comply with the default time threshold of the baseline high loss loopback data set, adopting the received high loss loopback data as a new baseline high loss loopback data set.

In addition, the processor may alert or notify a line monitoring system manager of the generation of the reconfigured optical communication path. The alert or notification may include information related to the reconfigured optical communication path. The line monitoring system manager may be operable in response to the alert or notification to instruct a line monitoring system scheduler to generate an updated line monitoring schedule by automatically replacing the scheduled runs on the previous optical communication paths with scheduled runs that now include the reconfigured optical communication path. For example, the updated line monitoring schedule generated by the processor may include instructions to monitor the reconfigured optical communication path and instructions to that cancel monitoring of any segments of the undersea optical communication transmission system that no longer transmit data. The segments of the undersea optical communication transmission system that no longer transmit data are referred to as inactive paths, while those that transmit data are referred to active paths. An inactive path, or segments thereof, may be switched to become, or become parts of a reconfigured optical communication path. Similarly, an active path, or segments thereof, that were switched to be a reconfigured optical communication path may be subsequently switched to no longer being part of the reconfigured optical communication path.

An additional function may also be performed by the processor with respect to the line monitoring program. In a further example, the reportable parameter table database that includes fault information related to the reconfigured optical communication path may be evaluated. Based on a result of the evaluation, one or more automatic fault signature algorithms may be selected from a list of automatic fault signature algorithms to apply to respective segments of the reconfigured optical communication path. The result of the evaluation indicates a specific automatic fault signature algorithm for application to each respective segment of the reconfigured optical communication path. Using the results of the provisioning a respective line monitoring equipment monitoring each respective segment of the reconfigured optical communication path by assigning the selected automatic fault signature algorithm to the respective line monitoring equipment.

Figure 6:
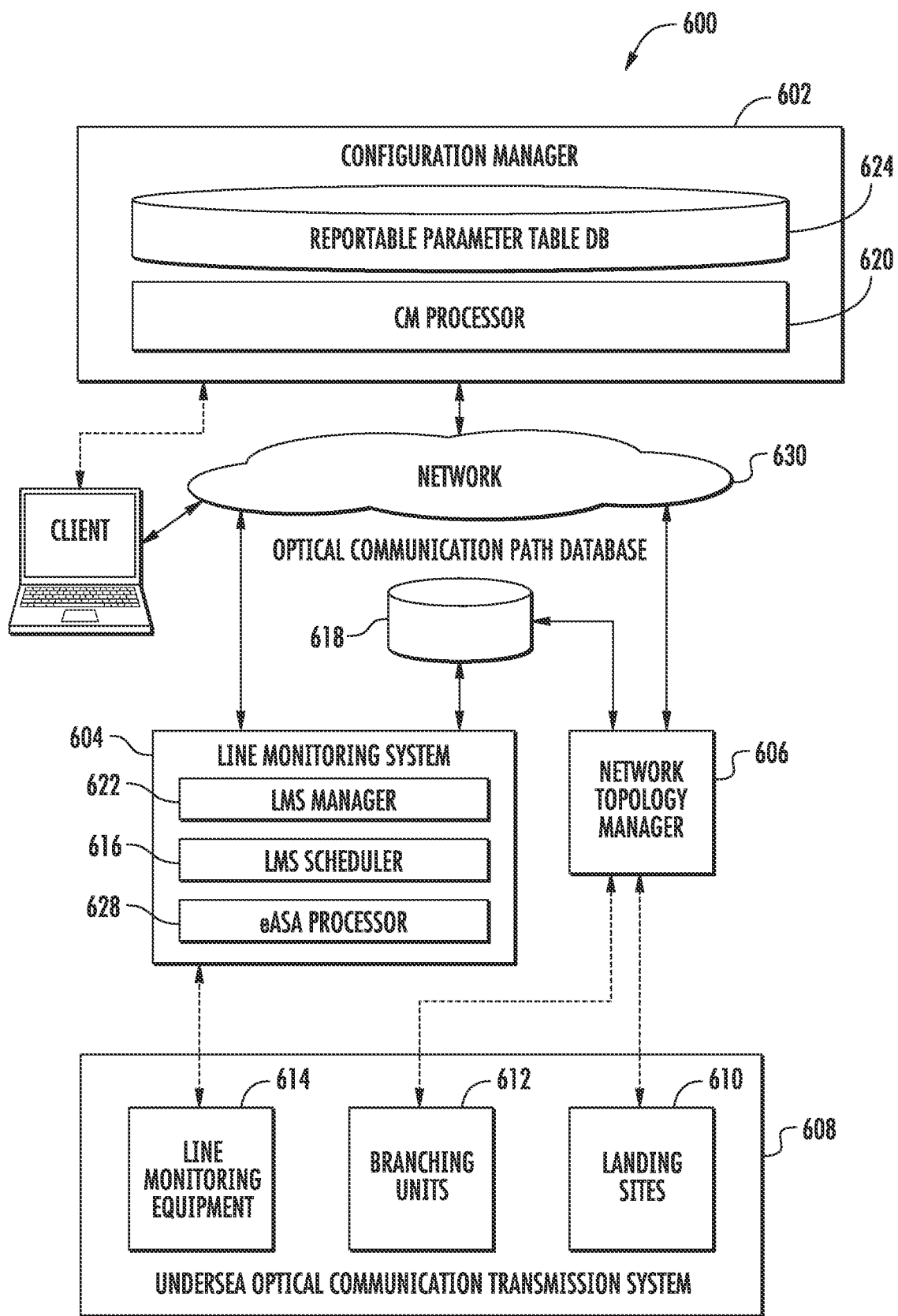
FIG. 6 illustrates an example system incorporating line monitoring and configuration management systems consistent with examples in the present disclosure.

FIG. 6 illustrates an example system incorporating line monitoring and configuration management consistent with examples in the present disclosure.

The configuration management system 600 incorporates multiple systems to enable the managing of a large optical communication transmission system, such as those shown in FIG. 1 and FIG. 2. The configuration management system 600 is shown in a highly simplified manner for purposes of clarity and not limitation. The configuration management system 600 may be implemented in hardware (e.g., circuitry), software, or a combination thereof. In an embodiment, the configuration management system 600 may be implemented at least in part as a plurality of instructions that may be executed by a controller/processor/server (not shown) to carry out the LMS processes as well as configuration management processes, e.g., process 500 of FIG. 5. As generally referred to herein, a controller/processor/server or process may be implemented as a processor (e.g., x86 processor), a field programmable gate array (FPGA), an application-specific integrated circuit (ASIC), or any other suitable processing device/circuitry.

In one aspect, the configuration management system 600 may include a configuration manager 602, an undersea optical communication transmission system 608, an optical communication path database 618, a line monitoring system 604, a network topology manager 606, and a network 630. The configuration manager 602 may include a CM processor 620 and a reportable parameter table DB 624.

The network 630 may be operable to couple the disparate but compatible systems and managers together to enable efficient exchange of information related to the configuration and performance of the optical communication transmission system, such as that shown in FIGS. 1 and 2. The respective systems and managers may communicate via the network according to known network protocols.

The undersea optical communication transmission system 608 may include line monitoring equipment 914, branching units 612 and landing sites 610 that are coupled to fiber optic cables (as shown in other examples, such as FIGS. 1 and 2, that also include repeaters and other devices. For ease of discussion, the repeaters, fiber optic cables and other devices that form optical communication paths are not shown in this example. The undersea optical communication transmission system 608 is operable to transmit optical communication signals along a number of optical communication paths. The line monitoring system 604 may also be referred to as an enhanced line monitoring system (eLMS) and may include a line monitoring system manager 622, eASA processor 628, and a line monitoring system scheduler 616. The line monitoring system manager 622 may receive system attributes from the line monitoring equipment 614.

In an operational example, the configuration management (CM) processor 620 may receive output from the eASA processor 628 and can map the output of the eASA processor 628 to operational parameters corresponding to one or more associated repeaters/elements of an optical transmission system. The CM processor 620 may be operable to compare baseline RPT values to the values output by the eASA processor 628 to determine differences between measurements made at different times, which in turn may be used to calculate changes to operational parameters. Details of the calculation of operational parameters for inclusion in the reportable parameter table DB 624 are described in U.S. Pat. No. 10,382,123, the entire contents of which are incorporated herein by reference.

In the disclosed system, the network topology manager 606 is operable to actively manage a topology within optical communication path database 618. The topology may contain all devices (e.g., repeaters, landing sites, branching units 612) and fiber spans (such as fiber 204 and the others of FIG. 2) that connect the devices. Each device or fiber span has key information that can be used to calculate the RPT table parameters. Additionally, the topology of the eBU contains a routing table that clearly documents connectivity between segments. The eBU topology node includes a routing table that explains how the eBU routes each of the fibers that is coupled to the eBU. At a high level, an eBU may be considered to be analogous to a router that routes signal traffic on one fiber to another fiber to enable the signal traffic to reach its intended destination.

When a fiber switch is performed, the routing table inside the associated eBU can be automatically reconfigured and the beginning of life data can be automatically recalculated. If a fault related to a device that is contained in the newly generated path ever happens, not only the beginning of life RPT, but also the current RPT can be calculated so that the detected fault information can be preserved even if the newly generated optical path has never been monitored before the fiber switch.

The CM processor 620 may be operable to execute programming code that enables the processor to perform topology management for the configuration manager 602.

By enabling the reporting of analysis results uniformly across the fiber pairs pumped by shared pumping lasers, a topology of the optical communication transmission system is created and actively managed by the configuration manager 602 based on inputs from the line monitoring system 604 and the network topology manager 606. The topology of the optical communication transmission system maintains key information (e.g., RPT BOL data, ASA fault history and the like) about the components and structure of the undersea optical communication transmission system. For example, the optical communication path database 618 or reportable parameter table DB 624 may be operable to store information related to each repeater in the optical communication transmission system: gain (inbound, outbound), tilt (inbound, outbound), individual pump degradation; each landing site (or station): gain (inbound, outbound), tilt (inbound, outbound), pump degradation (inbound, outbound), and output power; each optical fiber between two of repeaters, stations and undersea network elements: span loss (inbound, outbound), span length, refractive index; and for each branching unit: fiber connections.

When initiated the topology may be populated at the deployment of the optical communication transmission system, with, for example, one switch state of the permutations of eBU switch states configured. As the optical communication transmission system operates and faults occur and the branching units 612 switches optical paths to generate reconfigured optical communication paths, the line monitoring system 604 may update the configuration manager 602.

A client 626 may be coupled to the configuration manager 602 to review the respective databases, systems and components as well as to input control signals and control the branching units, such as branching units 612. For example, the client 626 may also be operable to transmit a remote control signal to devices within the undersea optical communication transmission system 608. For example, the client 626 may be operable to send signals to the respective line monitoring system 604 or managers 602 and 606 that, for example, enable provisioning and/or re-provisioning line monitoring equipment 614, cause a branching unit of the branching units 612 to switch to generate a reconfigured optical communication path, or perform other functions and operations.

At a high level, the configuration management system 600 may be operable to execute programming code that enables monitoring of the performance of the undersea optical communication system. For example, the CM processor 620, the eASA processor 628 and/or the LMS manager 622 may be operable execute the programming code and may be operable to determine, individually or in combination, that an optical communication path in the undersea optical communication transmission system has been reconfigured. The reconfigured optical communication path, for example, is formed by coupling a number of segments of the undersea optical communication transmission system together by a branching unit of branching units 612, which enable optical communication signal transmission via the reconfigured optical communication path. In the earlier examples, the reconfigured optical communication path has a first endpoint and a second endpoint.

In addition, the processor may obtain from the data storage system attributes of each respective segment of the number of segments from the first end point to the second endpoint of the reconfigured optical communication path. In some examples, the system attribute of the obtained system attributes may include span loss, device signal loss, actual gain, or the like. In some examples, the system attributes of each component of the optical communication transmission system in each respective segment identified as forming the reconfigured optical communication path include beginning of life data for each component. The system attributes of each respective segment of the number of segments from the first end point to the second endpoint of the reconfigured optical communication path may be evaluated by the processor. A reportable parameter table, or a number of entries into a reportable parameter table, may be generated based on the obtained system attributes. The reportable parameter table may, for example, include a listing of operational and structural parameters of system from the first endpoint to the second endpoint that form the reconfigured optical communication path. The report parameter table and its respective entries may be stored in the reportable parameter table DB 624.

The reportable parameter table DB 624 and optical communication path database 618 may be implemented in a volatile or non-volatile memory area. In some examples, the components of the line monitoring system 604 may not be physically located in the same system but may be distributed throughout the different systems, such as 602, 604, or 608. For example, the reportable parameter table DB 624 and optical communication path database 618 may be located at landing sites T1 and T2, respectively, of FIG. 1. Accordingly, components (e.g., the line monitoring equipment 614, the eASA processor 628, the line monitoring system scheduler 616 and the LMS manager 622) of the line monitoring system 604 may be operable to communicate with each other to share data and/or processing functions.

The line monitoring equipment 614 may be operable to receive loopback data in the form of one or more high loss loopback (HLLB) data sets from an optical communication transmission path in response to LME test signal(s) propagated on the network. Optical time domain reflectometer (OTDR) signals may also be used to characterize the system components in the optical communication transmission path but system characterization of the optical communication path by OTDR may require that the path be inactive. Loopback data may also be referred to as HLLB data sets or simply HLLB data. The HLLB data may be stored in a memory that provides HLLB storage, such as optical communication path database 618 or the like. In an example, the eASA processor 628 may operate on differential HLLB data sets from multiple system endpoints (which may be referred to as terminal stations, or simply stations) and from multiple measurement samples to provide results with improved accuracy relative to ASA approaches that operate on a single loopback data set. The eASA processor 628 may also be operable to detect changes near a terminal station/landing site even when signatures of the same may be incomplete.

The HLLB baseline data may include data of a current HLLB baseline (which may also be referred to as "LME baseline data") stored in the optical communication path database 618. Whenever HLLB data is received at the line monitoring system 604, the HLLB data may be validated and stored by the LMS manager 622 in the optical communication path database 618 as good data for comparison to any HLLB data obtained via the latest LME measurements.

In an example, the LMS manager 622 or network topology manager 606 may be configured to obtain the HLLB baseline from the optical communication path database 618 and provide the HLLB baseline data to the eASA processor 628. During operation, the LMS manager 622 may maintain the current HLLB baseline data without modification or may locally modify the baseline data based on detected faults/conditions that exceed a first predefined threshold or may replace an entire HLLB baseline data set. Using the latest HLLB data and the stored HLLB baseline data, all of the values in the reportable parameter table DB 624 may be derived by the CM processor 620.

The line monitoring system scheduler 616 sets schedules for the line monitoring equipment 614 to generate signals and make HLLB measurements automatically for each active optical path, where "active" means that the optical path is transmitting optical signals (e.g., actively streaming data via optical communication signals). For example, PLUM to LUCY in FIG. 3B with the optical communication path to TUPI being "inactive." The line monitoring schedule needs to be updated whenever an "inactive" optical communication path becomes "active", and vice versa. A scheduled monitoring event may be set by the line monitoring system scheduler 616 to have respective line monitoring equipment of the line monitoring equipment 614 make measurements once a day, every 36 hours, every three days, once a week, or the like on substantially all, or a representative portion, of the optical fibers within a fiber optic cable that form an optical communication path, including a reconfigured optical communication path. Alternatively, or in addition, the scheduled monitoring event may be user configurable via client 626.

The LMS manager 622 or network topology manager 606 may also be configured to provide/update baseline data stored in the optical communication path database 618. During operation, the LMS manager 622 or the network topology manager 606 may maintain the current RPT baseline data without modification and may be operable to locally modify the RPT baseline data based on detected faults/conditions that exceed a first predefined threshold or replace an entire RPT baseline data set.

The CM processor 620 may be operable to implement an RPT updater function that updates the reportable parameter table database utilizing, for example, an RPT update model or the like. The CM processor 620 may receive outputs from the eASA processor 628 and can map the output of the eASA processor 628 to operational parameters corresponding to one or more associated repeaters/components of the undersea optical communication transmission system 608. The CM processor 620 may execute programming code that implements an RPT updater function operable to compare baseline RPT values to the values output by the eASA processor 628 to determine variations. Using the results of the comparison, such as the determined variations, the CM processor 620 may calculate operational parameters for the reconfigured optical communication path as well as calculating changes to operational parameters to the optical communication paths affected by the generation of the reconfigured optical communication path. Thus, the CM processor 620 may access the reportable parameter table DB 624 to store operational parameters and any updated RPT baseline values based on the output of the eASA processor 628. Examples of RPT data for each component of an optical communication path that may be stored and updated in an RPT table (or RPT lookup table) in the reportable parameter table DB 624 may include span loss, power in, power out, gain and gain tilt. The most up-to-date RPT data of the reportable parameter table DB 624 may also be referred to as the current baseline RPT data. The RPT data may be stored in association with an optical communication path name for which the RPT data is calculated.

In an example the eASA processor 628 may report fault location and fault amplitude, which is sent with HLLB data to a next layer, such as the CM processor 620, for generation of the RPT data. The RPT baseline data set may include data that is different from the data used in the LMS baseline as the RPT baseline data is derived from the data that makes up the LMS baseline. For example, the eASA processor 628 of line monitoring system 604 may generate an indication that there is a system fault. The high loss loopback data that was applied to automatic signature analysis by the eASA processor 628 may have indicated that there was a fault of certain amplitude at a repeater or a span. However, the eASA processor 628 does not provide any additional information about the fault, such as effect on input and output powers, a magnitude of the gain and gain tilt, or an amount of span loss from a repeater to a next repeater. The CM processor 620 when generating data for the reportable parameter table DB 624 takes the high loss loopback data from the line monitoring system 604 and analyzed result from the eASA processor 628 and generates values and parameters that provide more information about the operational performance of the optical communication transmission system.

In an example, the CM processor 620 updates the RPT baseline data, for example, to replace or otherwise adjust one or more operational parameters in an RPT entry and stores the updated RPT baseline data back into the reportable parameter table DB 624. Some such example operational parameters include input power, output power, gain, span loss, spectral tilt, and/or span length for each amplifier and adjacent span represented within the one or more sets of HLLB data received from line monitoring equipment 614. In addition, operational parameters with information specific to a detected fault, such as a magnitude of a detected fault, and the amount of span loss from a repeater to a next repeater, and the like, may also be included in the RPT.

In an example, the line monitoring equipment 614 performs periodic execution of monitoring and data reporting processes. During each monitoring cycle, the line monitoring system 604 may receive new sets of HLLB loopback data from stations (e.g., based on LME test signals propagating along the WDM transmission system 100 as discussed above with reference to FIG. 1), and perform enhanced automatic signature analysis on the received data sets using the eASA processor 628. Based on a result of the enhanced automatic signature analysis, the eASA processor 628 may determine one or more measurements exceed a predefined threshold and indicate a fault condition has been detected.

In a further example, the client 626 may query the configuration manager 602 as well as the line monitoring system 604 in a command-response like fashion for monitoring results such as input power, output power, gain, span loss, and tilt. In turn, the configuration manager 602 may utilize the RPT data stored in the reportable parameter table DB 624 to satisfy the requests from the client 626.

The network topology manager 606 is coupled to the branching units 612 and the landing sites 610 and may receive topology information from each branching unit of the branching units 612 and store the received topology information in the optical communication path database 618. The configuration management processor 620 may be coupled to the line monitoring system 604 and the network topology manager 606 and is operable to obtain topology information from the network topology manager 606 and obtain the system attributes from the LMS manager 622. The CM processor 620 may also obtain data from the reportable parameter table database 624, such as the operational parameters calculated using the system attributes for each optical communication path of the plurality of optical communication paths.

In some examples, a portion of the number of optical communication paths of the undersea optical communication transmission system 608 are operable to transmit optical communication signals from a first landing site to a second landing site of the landing sites. The portion of the number of optical communication paths that transmit the optical communication signals may be referred to as active optical communication paths, such as LMP1 in FIG. 3A that extends from landing site PLUM to landing site LUCY.

The line monitoring equipment 614 includes a number of high loss loopback signaling devices, such as 132-1 to 132-*n* of FIG. 1. Each high loss loopback device of the number of high loss loopback signaling devices is operable to receive a line monitoring signal from a line monitoring equipment device. The line monitoring signal is transmitted to the LMS manager 622 for retrieval of the system attributes.

The CM processor 620 is further operable to calculate a number of parameters for an individual optical communication path using the system attributes and store the calculated number of parameters in the reportable parameter table DB 624 in relation to the individual optical communication path.

Each branching unit of the branching units 612 may be operable to generate a reconfigured optical communication path by switching from transmitting optical communication data on a segment of a first optical communication path to a segment of a second optical communication path. The LMS manager 622 may be operable to, for each respective segment of the reconfigured optical communication path, to provision respective line monitoring equipment that is monitoring the respective segment to collect data that used by the selected automatic fault signature algorithm. In addition, the line monitoring system (LMS) scheduler 616 is operable to alter scheduled measurements to be performed by the line monitoring equipment 614 in the reconfigured optical communication path.

Previously, fault detection allowed for only one type of fault detection algorithm to be applied to faults on an optical communication path, and that one applied fault detection algorithm was performed by way of looking for a set of known fault signatures over a set path or portion of the path. If the path did not exhibit one of the known fault signatures, the path was deemed to not have any faults. However, the presently disclosed technique examples and system examples are operable to use existing conditions (such as those measured or indicated by the LMS or the like) to select one or more types of fault detection algorithms for use by the eASA processor 628 to detect specific types of faults more accurately.

The eASA processor 628 may select one or more automatic signature algorithm, i.e., eASA algorithms used by the eASA processor 628, from a list of enhanced automatic signature analysis algorithms to apply to respective segments of the reconfigured optical communication path. For example, the result of the evaluation may indicate a particular type of fault or a particular pattern of system attributes for different segments of the reconfigured optical communication path. Or the eASA processor 628 may select several eASA algorithms for the same respective segment.

In a hypothetical example of selection of an enhanced automatic signature analysis algorithm, the eASA processor 628 when evaluating a fault based on HLLB data at repeater C9, for example, may detect that there is a +3 dB loss of signal from a fiber pair of repeater C9, as a result the eASA processor 628 may select automatic signature algorithm A to be applied to repeater C9. Similarly, the eASA processor 628 when evaluating HLLB data related to repeater AB, the eASA processor 628 may detect that there is a +6 dB loss of a fiber pair of repeater AB, and the eASA processor 628 may select automatic signature algorithm B.

In a further operational example, referring back to FIG. 2, the evaluation of the optical communication path from PLUM 202 to LUCY 226 may include a number of segments, such as a segment from PLUM 202 to repeater 206, repeater 206 to repeater 210, repeater 210 to repeater 214, repeater 214 to eBU 218, eBU 218 to repeater 222, and repeater 222 to LUCY 226. In addition, the respective segments may be combined such that fewer segments may be present. The same optical communication path from PLUM 202 to LUCY 226 may include PLUM 202 to repeater 210, repeater 210 to eBU 218, and 218 to LUCY 226. Based on a particular type of fault or a particular pattern of system attributes identified for each segment, the eASA processor 628 may be operable to select a specific set of enhanced automatic fault signature analysis algorithms for application to each respective segment of the reconfigured optical communication path. This eASA processor 628 selection capability enables not only customization of the fault detection for each repeater, but for each respective fiber pair within the repeater. This automatic signature analysis customization capability enables more accurate fault detection (for example, by selecting automatic signature algorithms that are able to accommodate different fault amplitudes) and provides better response capabilities to the line monitoring system 604.

Computer software, hardware, and networks may be utilized in a variety of different system environments, including standalone, networked, remote-access (aka, remote desktop), virtualized, and/or cloud-based environments, among others. While the respective components, such as the configuration manager, line monitoring system, and network topology manager are shown as separate elements, their functions may be combined in single components or devices and are not limited to the configuration shown in FIG. 6.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

Figure 7:
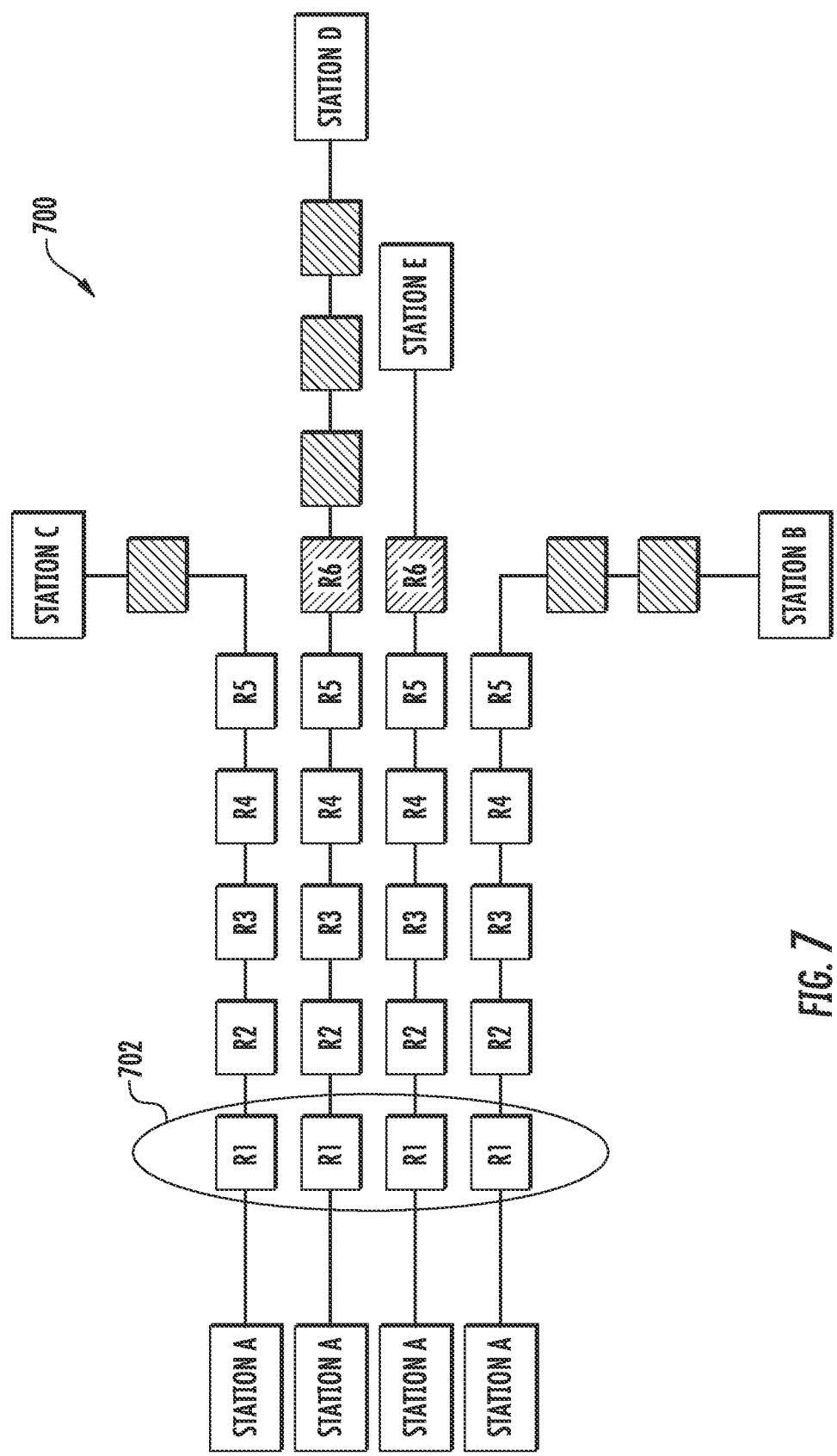
FIG. 7 illustrates an example of a process for cross fiber validation for line monitoring paths in an undersea optical communication transmission system.

FIG. 7 illustrates an example of a process for cross fiber validation for line monitoring paths in an undersea optical communication transmission system. In the undersea optical communication transmission system 700, there are four optical communication paths that are also line monitoring paths: station A-station B, station A-station C, station A-station D, and station A-station E.

The respective repeaters are shown separately for each line monitoring path, but each of the four repeaters may be respectively combined in a single device such as 702 in order to share common pumping lasers, but for ease of illustration are shown separately. All of the four line monitoring paths share pumping lasers in their first five repeaters R1, R2, R3, R4 and R5. The line monitoring paths from station A-station D and station A-station E also share pumping lasers on repeater R6. After that, each optical path has its own sequence of repeaters (unshared pumps shown in crosshatching) that do not share pumps with other fiber pairs. In order to declare a pump degradation on shared pumping lasers of any of repeaters R1, R2, R3, R4 or R5, four measurements need to be performed, each on a different LMP. In order to declare a pump degradation on pumping lasers of repeater R6, two measurements may be made on the line monitoring paths from station A-station E and station A-station D. In the example, all of the R1 repeaters are analyzed together, and a voting algorithm may be used to determine the parameters to be provided to the line monitoring system.

In high fiber count undersea communication systems, pumping lasers are shared across fiber pair in the spatial division multiplexing configuration. In such a system, each pumping laser's contribution to the optical gain is inversely proportional to total number of lasers. Thus, a single pumping laser's degradation will have a smaller fault signature. In order to provide more accurate results for this smaller fault signature, a configurable fault analysis technique and a voting technique is implemented.

In the configurable fault analysis technique, a processor such as eASA processor 628, LMS manager 622 or CM processor 620 of FIG. 6, for example, may be operable to select a most appropriate eASA algorithm to apply to the measurement data based on the current fault conditions. In an example, line monitoring equipment may measure high loss loopback data along different segments of the line monitoring path. The eASA processor 628 using the measured high loss loopback data may determines a fault signature for the respective different segments of the line monitoring path. Some types of fault signatures are more effectively and accurately evaluated particular types of fault analysis algorithms and techniques. For example, if the shape of a fault signature for a segment of the line monitoring path tends to change based on the loading conditions, a neural network analyzer may be more effective. According to a current implementation, the eASA processor 628 may choose the neural network analyzer for analysis. Alternatively, if the shape of the fault signature is more static, a random forest analyzer may be chosen. The fault analysis selection algorithm may be user configurable or even system configurable, so that if the selected fault analysis algorithm is deemed to be ineffective according to the field data, the applied fault analysis algorithm can be adjusted quickly.

Returning to the example of FIG. 7, after each individual fiber pair is analyzed using a configurable fault analysis technique, the processor may perform advanced cross fiber validation. In order the declare a fault on the pumping laser in repeater R1, the line monitoring system may perform measurements on the line monitoring paths of station A-station B, station A-station C, station A-station D and station A-station E and collect eASA (enhanced automatic signature analysis) results for all these four fiber pairs and compare them. If more than half of the eASA results indicate that there is a fault or a high probability of a fault, in repeater R1, then the processor may declare a fault in repeater R1.

An example of a cross fiber validation technique may be implemented when, for example, all of the fibers in repeater R1 share a single pump laser but each fiber is individually monitored and evaluated for a correlation between the outputs. For example, when the HLLB measurement is done for a line monitoring path (LMP), the eLMS performs standard eASA analysis and store the fault information if a pump degrade or other fault is detected. The processor may examine whether all of the other LMPs that share the same pumping laser have had HLLB measurements performed. If not, the processor may wait for the measurements of the other LMPs to be finished, otherwise the processor compares the result generated by this measurement against the results generated by measurements from the other LMPs. The comparison process utilizes a voting algorithm in which, for example, the majority setting is configurable. In some examples, if more than half of the shared pumping LMPs detect there is a pump laser fault on a shared path, the eLMS declares a pump is degraded and calculates the RPT for the LMPs that have faults confirmed by the voting algorithm. Alternatively, in other systems, the voting may include "soft voting", in which, for example, if 30% declares fault A, 40% declares fault B and 30% declares fault C, it may make sense to declare fault B instead declare no fault. In a further example, systems that utilize hard voting a majority of more than 50% is usually required. Both types of systems have their applicable conditions that make one or the other more desirable.

A majority for the voting accuracy may, for example, be considered 2 or more.

The processor is also operable to detect multiple faults at the same location. For example, if an LMP does not have activity for a certain period of time, such as 1 minute, 10-20 minutes or the like, the eLMS may declare the LMP is inactive and out-of-service for purposes of the analysis. For example, if the LMP of station A-station E is declared by the processor to be inactive, the voting algorithm does not take the fiber pair from station A-station E into account and evaluates the measurements from the other three LMPs. The measurements from the other three LMPs may be the sole measurements used to determine whether a shared pumping laser is degraded or not. When the LMP station A-station E is determined to be active and line monitoring is enabled, measurements will commence. If the shared pump laser is determined to be degraded in the LMP station A-station E, the processor is operable to inject the fault into the station A-station E topology as well as the HLLB baseline to bring the station A-station E LMP back into sync with the other three LMPs. The advantage of this method is that it continues to operate if multiple faults occur when a fiber pair is out of service. For example, if repeater R2 and repeater R3 both have a degradation when the LMP station A-station E is out of service, the prior methods would not be able to detect the combined fault signature corresponding to the degradation of repeater R2 and repeater R3. However, the combined fault signature corresponding to the degradation of repeater R2 and repeater R3 can be detected with the disclosed method because the faults are tracked and will be injected automatically after the fiber pair is determined to be active again, all without human intervention.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution or may be written in a scripting language such as (but not limited to) HTML or XML or the like. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in the disclosed examples.

At least one computer-readable storage medium may include instructions that, when executed, cause a system to perform any of the computer-implemented methods described herein.

Some examples may be described using the expression "one example" or "an example" along with their derivatives. These terms mean that a particular feature, structure, or characteristic described in connection with the example is included in at least one embodiment. The appearances of the phrase "in one example" in various places in the specification are not necessarily all referring to the same example. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to convey the substance of their work most effectively to others skilled in the art.

A process is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the described purpose, or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the described method steps. The described structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed example may need more features than are expressly recited in each claim. Rather, as the following claims reflect, novel subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An undersea optical communication transmission system performance evaluation device, comprising:
 a plurality of line monitoring equipment (LME) devices operable to determine operational performance of an undersea optical communication transmission system, wherein each LME device of the plurality of LME devices is positioned at terminal stations that form the undersea optical communication system;

a data storage operable to store information related to the undersea optical communication transmission system; and a processor coupled to the plurality of LME devices and operable to execute programming code that enables monitoring performance of the undersea optical communication system, wherein the processor is further operable to:

determine that an optical communication path in the undersea optical communication transmission system has been reconfigured, wherein the reconfigured optical communication path is formed by coupling a plurality of segments of the undersea optical communication transmission system together enabling optical communication signal transmission, and the reconfigured optical communication path has a first endpoint and a second endpoint;

obtain, from the data storage, system attributes of each respective segment of the plurality of segments from the first endpoint to the second endpoint of the reconfigured optical communication path;

evaluate the system attributes of each respective segment of the plurality of segments from the first end point to the second endpoint of the reconfigured optical communication path; and generate a reportable parameter table based on the evaluated system attributes, wherein the reportable parameter table includes a listing of operational parameters of the reconfigured optical communication path.

2. The performance evaluation device of claim 1, wherein the processor, when determining that the optical communication path has been reconfigured, is operable to:

receive switch indication signals indicating that an optical switch of a branching unit switched to provide the reconfigured optical communication path, wherein the switch indication signals identify segments of the undersea optical communication transmission system coupled together to form the reconfigured optical communication path.

3. The performance evaluation device of claim 2, wherein the processor, when obtaining, from the data storage, the system attributes of each respective segment of the plurality of segments from the first end point to the second endpoint of the reconfigured optical communication path, is operable to:

access, in the data storage, beginning of life data for each segment identified as forming the reconfigured optical communication path, wherein the beginning of life data includes system attributes of each component of the optical communication transmission system in each respective segment identified as forming the reconfigured optical communication path.

4. The performance evaluation device of claim 3, wherein the processor, when evaluating the system attributes of each respective segment of the plurality of segments from the first end point to the second endpoint of the reconfigured optical communication path, is further operable to:

calculate, using the beginning of life data, baseline information for each segment identified as forming the reconfigured optical communication path;

evaluate operational performance of the reconfigured optical communication path with respect to the calculated baseline information, wherein the evaluation generates the operational parameters; and update the reportable parameter table using the operational parameters generated during the evaluation of the operational performance of the reconfigured optical communication path.

5. The performance evaluation device of claim 4, wherein the processor, when evaluating the operational performance of the reconfigured optical communication path with respect to the calculated baseline information, is further operable to:

receive operational performance signals from individual line monitoring equipment of the plurality of line monitoring equipment, wherein the operational performance signals are received from line monitoring equipment coupled to a plurality of high loss loopback data sources positioned along the reconfigured optical communication path; and generate the operational parameters based on the received operational performance signals for the updating of the reportable parameter table.

6. The performance evaluation device of claim 1, the processor further operable to:

provision operational parameters of one or more LME devices of the plurality of line monitoring devices based on obtained system attributes of the reconfigured optical communication path;

update a line monitoring system database with a list of the one or more LME devices that had operational parameters provisioned based on the reconfigured optical communication path; and output an updated monitoring schedule to all of the LME devices effected by the reconfigured optical communication path.

7. The performance evaluation device of claim 1, wherein the processor, when determining that the reconfiguration of the optical communication path has been reconfigured, is operable to:

receive an updated routing table from a branching unit optical switch, wherein the updated routing table indicates connections between segments from the first endpoint to the second endpoint.

8. The performance evaluation device of claim 1, the processor is further operable to:

evaluate a reportable parameter table database that includes fault information related to the reconfigured optical communication path;

based on a result of the evaluation, select one or more automatic fault signature analysis algorithm from a list of automatic fault signature analysis algorithms to apply to respective segments of the reconfigured optical communication path, wherein the result of the evaluation indicates the one or more automatic fault signature analysis algorithms for application to each respective segment of the reconfigured optical communication path; and provision a respective line monitoring equipment monitoring each respective segment of the reconfigured optical communication path by assigning the selected automatic fault signature analysis algorithm to the respective line monitoring equipment.

* * * * *